Patented Dec. 5, 1922.

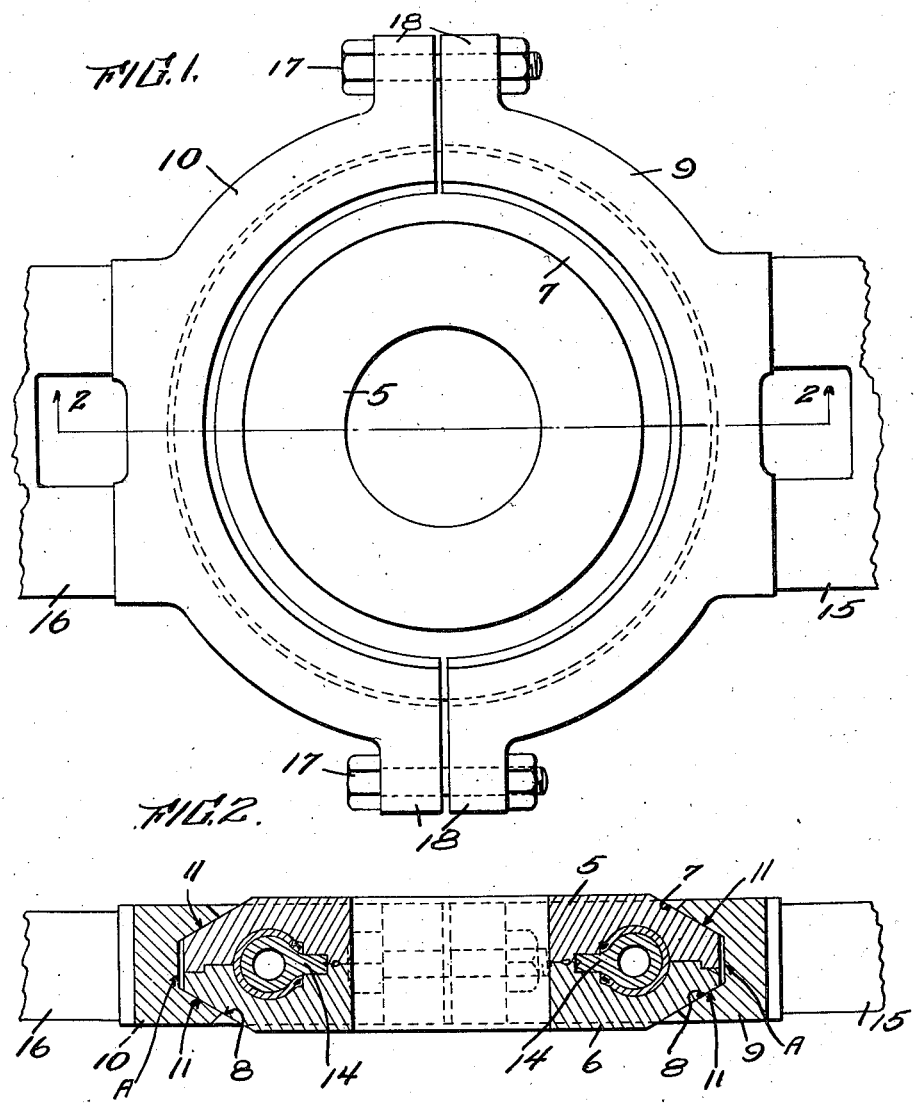

1,438,160

UNITED STATES PATENT OFFICE.

WILL C. STATE, OF AKRON, OHIO, ASSIGNOR TO THE GOODYEAR TIRE & RUBBER COMPANY, OF AKRON, OHIO, A CORPORATION OF OHIO.

MOLD.

Application filed March 11, 1919. Serial No. 282,000.

*To all whom it may concern:*

Be it known that I, WILL C. STATE, a citizen of the United States, and resident of Akron, Ohio, have invented new and useful Improvements in Molds, of which the following is a specification.

My present invention relates to new and useful improvements in molds.

The principal object of my invention is the provision of a mold having means whereby the separable sections comprising the body of the mold may be brought under pressure into the proper mating relationship and maintained in this condition without the attendance of extraneous pressure means.

I have illustrated in the accompanying drawing and described in the following specification, a preferred embodiment of my invention.

In the drawing:

Figure 1 is a face view of a mold embodied in my invention; and

Figure 2 is a section on the line 2—2 of Figure 1.

Before taking up a detailed description of the construction and manner of use of my invention as embodied in the particular construction shown in the accompanying drawing, I desire to explicitly point out that while I have illustrated and hereinafter describe a mold which is particularly adapted to use in the rubber industry for curing pneumatic tires, my invention may and is intended to be effectively employed in the construction of molds for use in any of the arts wherein a plastic material is treated in the course of manufacture by being placed within a mold comprising separable sections which need to be either brought under pressure into mating relationship or maintained in such relationship to effect the proper molding of the material.

Referring specifically to the drawings, the numerals 5 and 6 denote two complemental separable sections of a mold designed for use in curing pneumatic automobile tires. The outer peripheral edge of each mold section is chamfered to produce, when the mold sections are placed one upon the other in the manner shown in Figure 2, the diverging wedge surfaces 7 and 8, which (as shown in Figure 2), define a substantially V-shaped wedge on the outer circumference of the mold.

For use in connection with this wedge shaped periphery of the mold, I provide a pair of substantially semi-circular channel wedge members 9 and 10, which when mated in the manner shown in Figure 1, form a substantially angular ring which encloses the outer circumference of the mold.

As shown, the interior channels formed in the wedge members 9 and 10, have outwardly sloping walls 11, which correspond to the wedge faces 7 and 8 in their degree of inclination. The depth of the channels in the wedge members is such, however, that before the tip of the wedge, produced by the faces 7 and 8, engages the bottom wall A, the mold sections will have been forced together against the resistance of the plastic rubber.

In this connection, it will be understood that in the tire manufacturing industry, the tires when built up on their forming cores (one of which is indicated at 14) are of such cross sectional dimensions as to require that the mold sections be subjected to relatively high pressure and the rubber condensed in volume before the mold sections come to the proper mating relationship for curing of a tire.

As shown in Figure 1, the mold sections may be laid on a table between movable pressure members, such for instance, as opposite sets of hydraulic rams 15 and 16 shown diagrammatically in Figure 1, in order that the wedge sections 9 and 10 may be properly pressed onto the wedge shaped periphery of the mold.

After the wedge members 9 and 10 have been moved toward each other by the hydraulic rams or any suitable equivalent thereof and the mold sections thus properly forced under pressure into the proper mating relationship, fastening devices such, for instance, as the draw bolts 17, which pass through the mating pairs of projecting lugs 18 formed on the ends of the wedge members 9 and 10, may be employed to hold the wedge members against displacement from the closed position to which they have been forced by the rams. Thus, the mold sections may be maintained in the required relationship by the wedge members after the mold is removed from the rams or other wedge applying device.

A mold constructed according to my present invention is of great advantage in the tire manufacturing industry since it permits the molds to be individually handled during the curing of the tire and eliminates the necessity of employing a hydraulic ram in the heater wherein the tires are customarily subjected to the curing or vulcanizing heat.

Another great advantage my present invention has over the prevalent type of mold structures, as used in the tire industry, is that it is readily adaptable to heaters of the so-called continuous type. In these heaters, the molds are fed into the heater at one end and are continuously moved forward by any suitable mechanism during which time the molds are acted upon by suitable heat, such as steam, warm air, hot water, etc., and upon reaching the opposite end of the heater, they are removed, the molds opened, contents removed, and the molds reloaded whereupon they are again conveyed to the loading end of the apparatus. These heaters are of various types, the more common of which being of sufficient length to permit the molds to be slowly conveyed therethrough, the time of movement through the heater representing the length of the desired cure. It will be apparent that the molds may be projected through the heater rapidly in case a short cure is desired, or they may be very slowly projected through the heater in case a longer cure is desired.

What I claim is:

1. A mold comprising complemental sections adapted to define a molding cavity, separate oppositely disposed clamps adapted to engage the periphery of said complemental sections to subject material in the molding cavity defined by said complemental sections, to molding pressure when pressure is externally applied to said clamps, and means adapted to apply external pressure to said clamps.

2. A mold comprising complemental sections having oppositely disposed flared faces and adapted to define a molding cavity when mated, opposed sectional clamping members having flared faces adapted to engage the flared faces of said complemental sections to transmit pressure externally applied to said clamps to said complemental sections to force said sections into proper mating relation, and means adapted to apply external pressure to said clamps.

3. A mold comprising complemental sections adapted to define a molding cavity and having oppositely disposed flared faces, opposed sectional clamping members having correspondingly flared faces adapted to engage the flared faces of said complemental sections to force said sections together when external pressure is applied to said clamping members, and means adapted to apply external pressure to said clamps.

4. A mold comprising complemental sections adapted to define a molding cavity and having oppositely disposed flared faces, opposed unitary sectional clamping members having correspondingly flared faces adapted to engage the flared faces of said complemental sections to transmit pressure externally applied to said clamping members to the molding cavity defined by said complemental sections, and means for applying pressure to said sections.

5. A mold comprising complemental sections adapted to define a molding cavity and having oppositely disposed flared faces, opposed sectional clamping members having correspondingly flared faces adapted to engage the flared faces of said complemental sections to transmit pressure externally applied to said clamping members to the molding cavity defined by said complemental sections, and means for maintaining the pressure applied to the molding cavity after the removal of the externally applied pressure.

6. A mold comprising complemental sections having oppositely disposed flared faces and adapted to define a molding cavity when mated, and opposed sectional clamping members having flared faces adapted to engage the flared faces of said complemental sections to transmit externally applied pressure to said complemental sections to force said sections into proper mating relation, and removable means for locking said clamping members in their clamping relations.

7. A mold comprising complemental sections adapted to define a molding cavity, oppositely disposed clamps adapted to engage the periphery of said complemental sections and adapted to subject material in the molding cavity defined by said complemental sections to molding pressure when pressure is externally applied to said clamps, and means for locking said clamps in position to maintain the molding pressure upon material in the molding cavity.

8. A mold comprising complemental sections adapted to define a molding cavity, the periphery of said complemental sections being provided with oppositely disposed and abruptly flared surfaces, opposed sectional clamps having correspondingly disposed flared surfaces adapted to engage the flared surfaces of said complemental sections to transmit pressure externally applied to the clamps to material contained in the molding cavity.

9. A mold comprising complemental sections adapted to define a molding cavity, the periphery of said complemental sections being provided with oppositely disposed and abruptly flared surfaces, opposed sectional clamps having correspondingly disposed flared surfaces adapted to engage the flared surfaces of said complemental sections to transmit pressure externally applied to the clamps to material contained in the molding cavity, means for applying external pressure to said clamps, and locking means independent of the pressure applying means for holding said clamps in position to maintain the material in the molding cavity under pressure.

10. A mold comprising complemental sections adapted to define a molding cavity, the periphery of said complemental sections being provided with oppositely disposed and abruptly flared peripheral surfaces, opposed sectional clamps having correspondingly flared surfaces adapted to engage the flared surfaces of the complemental sections and adapted to transmit externally applied pressure to material contained in the molding cavity, means for applying external pressure to said clamps to force the complemental sections into mating relation, and locking members independent of the pressure applying means for holding the clamps in position to maintain the material in the molding cavity under pressure after the removal of the external pressure.

In witness whereof, I have hereunto signed my name in the presence of two subscribing witnesses.

WILL C. STATE.

Witnesses:
 L. M. HARTMAN,
 E. C. LEADENHAM.